United States Patent [19]

Höfgen

[11] 4,333,081
[45] Jun. 1, 1982

[54] MONITORING SYSTEM FOR SCANNING-BEAM MICROWAVE LANDING APPARATUS

[75] Inventor: Günter Höfgen, Kornwestheim, Fed. Rep. of Germany

[73] Assignee: International Standard Electric Corporation, New York, N.Y.

[21] Appl. No.: 159,655

[22] Filed: Jun. 16, 1980

[30] Foreign Application Priority Data

Jun. 20, 1979 [DE] Fed. Rep. of Germany ....... 2924847

[51] Int. Cl.³ ........................... G01S 1/54; G01S 7/40
[52] U.S. Cl. ................................. 343/108 M; 343/17.7
[58] Field of Search .................. 343/17.7, 107, 108 R, 343/108 M

[56] References Cited

U.S. PATENT DOCUMENTS 3,713,160 1/1973 Becavin ...................... 343/108 R X
3,818,476 6/1974 Coulter et al. .............. 343/108 R X
4,068,236 1/1978 Alford ................................. 343/108

Primary Examiner—T. H. Tubbesing
Attorney, Agent, or Firm—William T. O'Neil

[57] ABSTRACT

Monitoring apparatus for a time reference scanning-beam microwave landing system which supplies directional information throughout a 40° to 60° landing approach sector. Several transponders are provided within the radiation field of the directional antenna of the landing system, these being directionally separated. Each transponder retransmits a part of the beam passing by it back to the directional antenna of the microwave landing system. The retransmitted signals are in converted form and are processed by the MLS system similar to radar echo signals, but are modulated at different discreet frequencies for identification. Errors are detected by comparing received transponder signals with locally generated reference signals at the MLS equipment.

7 Claims, 4 Drawing Figures

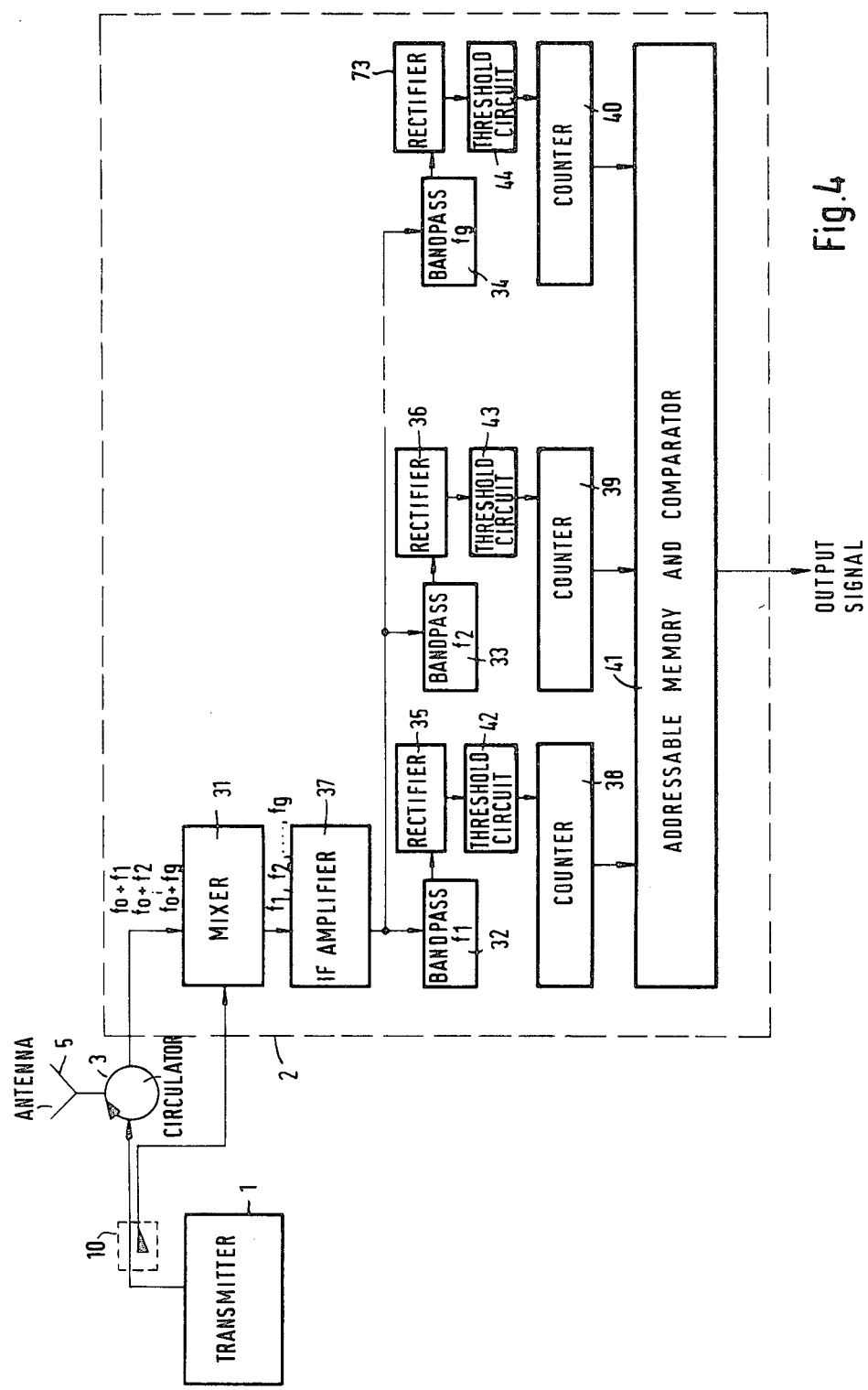

MONITORING SYSTEM FOR SCANNING-BEAM MICROWAVE LANDING APPARATUS

BACKGROUND OF THE INVENTION

1. Field of the Invention

The invention relates to angle data monitoring in a scanning-beam system generally, and more particularly to such a system for the so-called time-reference, scanning-beam microwave landing system.

2. Description of the Prior Art

The so-called scanning-beam microwave landing system of the time-reference type is sometimes known as "TRSB MLS" and that abbreviation will be used for convenience hereinafter. Such a system is prior art per se and has been described in the technical literature including the IEEE Transactions on Antennas and Propogation—Vol. AP-25, No. 3, May 1977. In that publication some aspects of the prior art in Time-Reference Scanning-Beam Microwave Landing Systems was described.

In the TRSB MLS system, a predetermined sector of space overlaying an airport runway or the extension thereof in space, is scanned by two narrow beams. The scan is oscillatory in nature, i.e. in one angular sense through the sector of space and then immediately in the other angular sense through the same sector of space. One beam is devoted to such a scanning action in the azimuth plane and the other in the elevation plane.

Equipment on an aircraft on landing approach can determine its angular position with respect to runway center by determining time between successive beam crossovers. Since the scan is reciprocating, i.e. back and forth or up and down for azimuth and elevation situation respectively, the closer the bearing of the aircraft is to the angular starting point of each cycle of first and second scan senses, the greater will be the time delay between first and second beam crossovers as detected on the aircraft. Similarly, an angle of approach near the turn-around in scanning sense produces a small time difference between beam crossovers.

The system to which the invention applies is in a sense, an open-loop system and therefore field monitors have been provided to check the function of beam-scanning angle versus time, since that function is critical to the accuracy of the system. For the purpose, field monitors, each containing a receiver and each connected back to the transmitting station by means of a cable have been provided. Knowing the angles of such monitors, circuits can be employed for comparing the actual instantaneous beam angle or the angular velocity of the scan or both. Such systems have usually been limited to two field monitors, since the associated cabling becomes burdensome, expensive and difficult to install if more such monitors are used.

The manner in which the present invention provides more complete monitoring throughout the sector of scan without encountering the expense and other difficulties of prior art monitoring techniques will be evident as this description proceeds.

SUMMARY

It may be said to be the general object of the present invention to provide a multiple monitoring point and arrangement for the TRSB MLS equipment. Small, inexpensive, and self-contained transponders are provided and are distributed at predetermined angles within the scan sector. Preferably, these transponders are uniformly distributed angulalry along an arc centered on the transmitting antenna of the TRSB MLS ground equipment, and are therefore symmetrically placed in distance from the said transmitting antenna as well as in angle of location.

As the scanning-beam passes over each of the monitoring transponders, a portion of the energy intercepted by the transponder is modulated and retransmitted back to the transmitting antenna which also operates as a receiving antenna in the arrangement of the present invention. Discrete modulation is applied in each transponder as a function of the angle of its location within the scanning sector. The pulse-like retransmitted energy thus received at the scanning antenna site is discretely identified and can be used to compare actual physical scan angle with a predetermined reference to identify variations requiring the attention of operator or maintenance personnel.

A detailed description of a typical embodiment according to the invention follows.

BRIEF DESCRIPTION OF THE DRAWINGS

The invention will now be explained in more detail, by way of example, with reference to the accompanying drawings, in which:

FIG. 4 is a block diagram of the receiving and evaluating apparatus of the monitoring facility.

DETAILED DESCRIPTION

The monitoring facility for the azimuth station will be explained with the aid of FIG. 1.

The transmitting facility 1 of the TRSB MLS is located on the extension of the runway 7 well beyond the normal touchdown point. It radiates a narrow beam 6 from an antenna 5 in the direction of the landing aircraft. This beam is scanned "to and fro" (first in one angular sense, and immediately thereafter in the opposite angular sense through the sector of interest, for each "cycle" of scan). The angular sector limits are indicated by dashed lines. From the time difference between two beam passes, the aircraft determines its angle with respect to the transmitting facility.

The monitoring apparatus according to the invention checks the narrow beam sweeps correspondence with discrete predetermined points within the sector. To this end, several transponders n (identified 4/1 thru 4/9 in FIG. 1) are equally spaced angularly on a segment of a circle, typically about 50 m from the antenna 5 of the transmitting facility 1. The transponders will be explained later with the aid of FIG. 2.

Figures 1, 2:
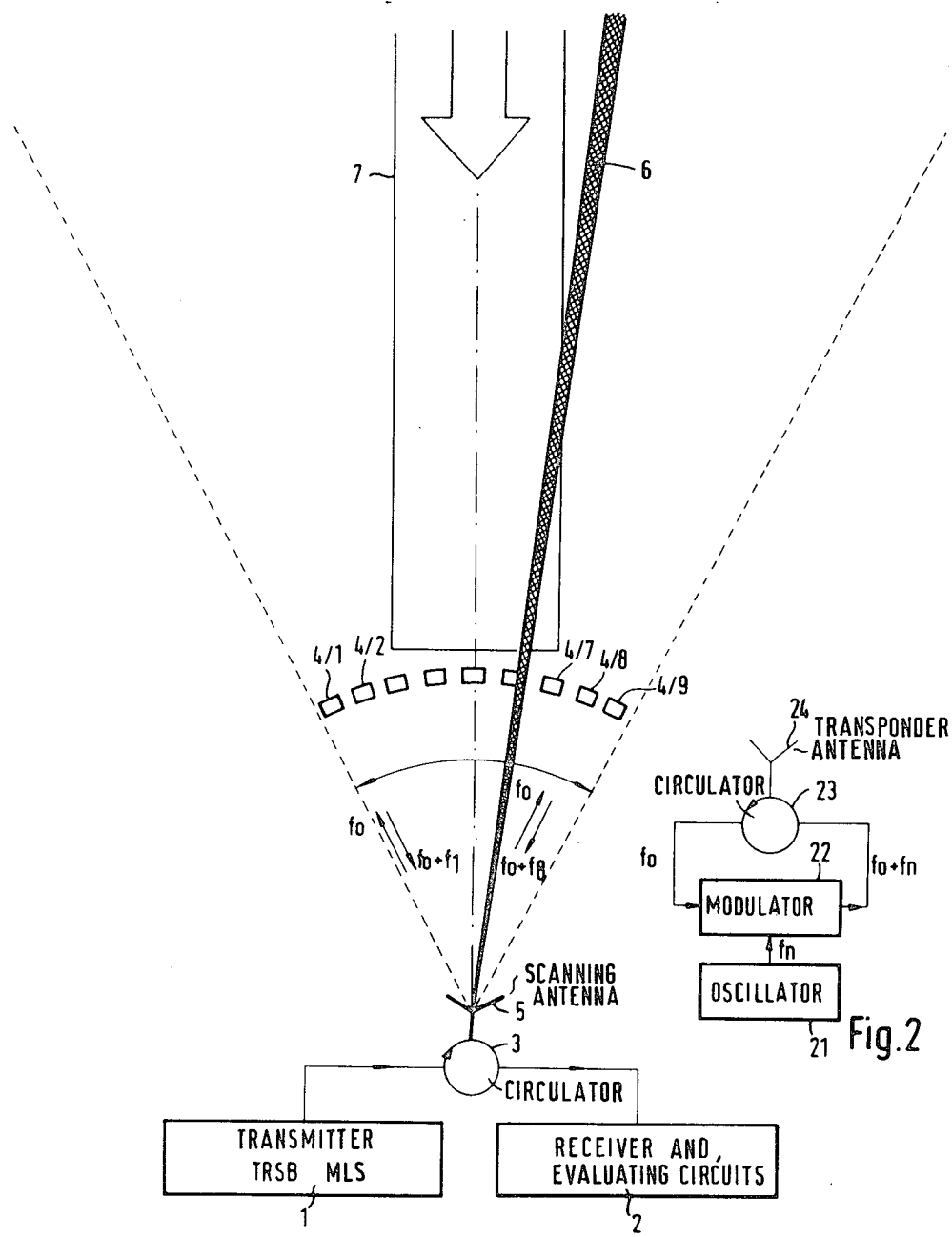
FIG. 1 is a plan view of the physical layout of the transmitting and monitoring facilities.
FIG. 2 is a block diagram of a typical transponder of the monitoring facility.

Although FIG. 1 shows nine transponders, it has been found that the use of 16 transponders for a region of beam coverage of ±40° is advantageous.

When the narrow beam is scanned across any transponder (4/1–4/n) the latter transmits part of the intercepted energy in converted form (e.g. modulated) back to the antenna 5 of the transmitting facility 1 as a reply signal. This retransmitted energy is received by the antenna 5 which, at the time of arrival of the reflected signal, is still pointed approximately at the respective transponder, since the scanning time is long compared to the signal transit time. Accordingly, no additional antenna is required to receive the retransmitted signals from the transponders.

The antenna 5 is connected via a circulator 3 to the CW transmitter 1 of the TRSB MLS and to the receiving and evaluating section 2 of the monitoring facility. The signals from the transponders have a considerably smaller amplitude than the radiated signals, and in view of the duplexing and isolating effect have no disturbing effect on the transmitting facility 1. The receiving and evaluating apparatus 2 will be explained with the aid of FIG. 4. Transmitter 1 is entirely conventional and as employed in prior art TRSB MLS equipment.

Each of the transponders 4/n (FIG. 2) contains a directional antenna 24 pointed at the antenna 5 of the transmitting facility 1, a circulator 23, a modulator 22, and an oscillator 21 generating the modulation frequency $f_n$. The received signal at each transponder, which has the frequency $f_0$, is phase—or frequency-modulated in a modulator 22 at the frequency $f_n$, which is different for each transponder. The modulated signal, having the frequency $f_0+f_n$, is radiated by the antenna 24. The modulation frequencies are, for example:

$f_1 = 3,000$ Hz
$f_2 = 3,900$ Hz
$f_3 = 5,070$ Hz
$f_9 = 24,200$ Hz

These modulation frequencies are illustrative but may be higher for greater accuracy. Alternatively, in lieu of being modulated at different frequencies, the signals from the transponders may also be discretely coded from transponder to transponder.

Figure 3:
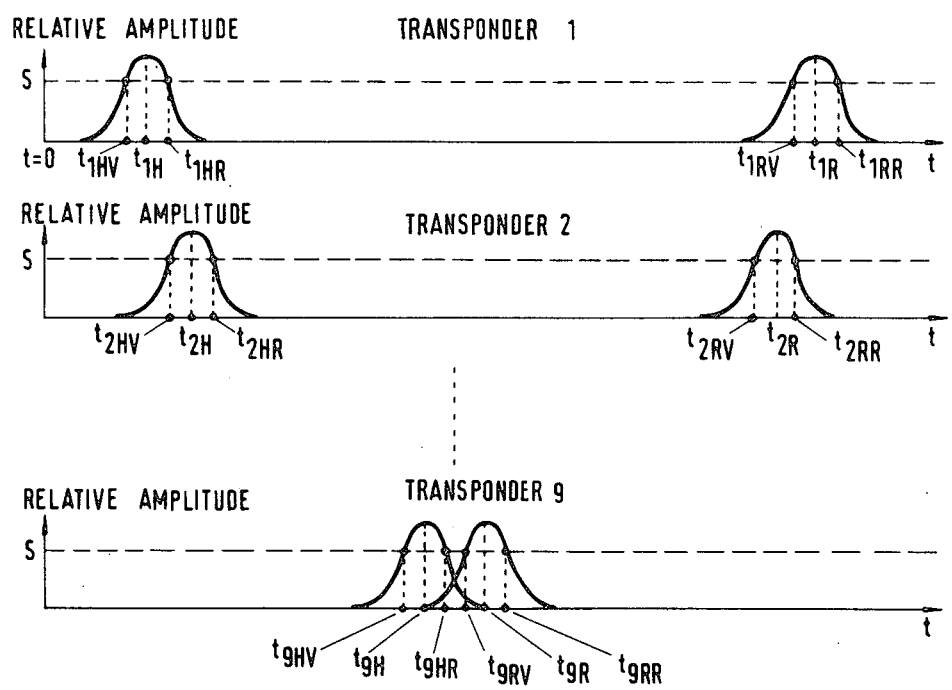
FIG. 3 shows graphs to explain the time differences to be monitored.

Referring now to FIG. 3, it will be explained which time differences are monitored to determine whether the signals from the transponders are being received in the prescribed time sequence, i.e., whether the scanning beam is performing the prescribed motion.

If, in FIG. 1, the beam is scanned first from the left to the right and then from the right to the left, it passes first the transponder 4/1 and then seriatim transponders 4/2 thru 4/9. On its return sweep, it passes first the transponder 4/9 and then the other transponders 4/8 to 4/1. The amplitude curve of the signal from a transponder has approximately the shape of a pulse, FIG. 3 being a qualitative representation thereof.

The scan begins at the left-hand limit of the sector at the time $t=0$, and the beam is pointed at the transponder 4/1 for a given period about the instant $t_{1H}$. The value of $t_{1H}$ is calculated from the equation $$t_{1H} = (t_{1HV} + t_{1HR}/2), \quad (1)$$

where $t_{1HV}$ is the instant at which the reply signal from the transponder 4/1 exceeds an amplitude threshold S, and $t_{1HR}$ is the instant at which this signal falls below this threshold again. On its return sweep, the beam passes the transponder 4/1 at the instant $$t_{1R} = t_{1RV} + t_{1RR}/2 \quad (2)$$

The instant $t_{1R}$ is determined analogously to the instant $t_{1H}$.

Corresponding considerations apply to the other transponders. To check the scan, it is determined whether the time differences $$\Delta t_n = t_{nR} - t_{nH} \quad (3)$$

(where n=ordinal numbers of the transponders) have the prescribed values. The time difference for the first transponder, $\Delta t_1$, is the largest. The smallest time difference is that for the last transponder 4/9.

The reception and evaluation of the reply signals from the transponders will now be explained in more detail with the aid of FIG. 4.

The signals are received by the antenna 5 and applied through the circulator 3 to the mixer 31. For down-conversion, a portion of the transmittable signal, which has the frequency $f_0$, is extracted by means of a directional coupler 10 and fed to the mixer 31. The mixer 31 then provides signals having the frequencies $f_1, f_2, \ldots, f_9$, depending on which transponder the signals come from.

The mixer output signals are applied through an amplifier 37 to band-pass filters 32, 33, 34 which pass signals at the modulation frequencies $f_1, f_2, \ldots, f_9$ respectively, of the individual transponders. Ommission of signals and circuits corresponding to $f_3$ thru $f_8$ is to be understood to be for simplification, however these signals and circuits are of course present in the practical equipment.

The output signals of the band-pass filters 32, 33 and 34 are rectified in corresponding rectifiers 35, 36, 73.

Each of the rectified signals is then fed to a corresponding threshold circuit 42, 43, 44, which delivers a trigger pulse when the signal amplitude exceeds or falls below the threshold value S (FIG. 3). Thus, at the instants $t_{nHV}$, $t_{nHR}$, $t_{nRV}$, and $t_{nRR}$, n threshold circuits provide trigger pulses which are fed to n counting devices (counters) 38, 39, 40.

In the first counting device 38, the trigger pulse provided at the instant $t_{1HV}$ resets the counter to zero and the trigger pulse provided at the instant $t_{1HR}$ stops it. Analogous remarks apply to the two other counters and to the trigger pulses provided at the instants $t_{1RV}$ and $t_{1RR}$. To stop the desired counter by a given trigger pulse, the counters 38, 39 and 40 are to be understood to be preceded by conventional logic circuits. All counts are transferred to the comparator 41 (with addressable memory).

Since all counts are proportional to a given period of time, instead of comparing the time differences $\Delta t_n$ with the nominal-time differences, it suffices to compare correspondingly determined count differences with the nominal-count differences. To this end, the microcomputer 41 calculates, by equations analogous to the equations (1), (2), and (3), count differences which it compares with nominal values. Such nominal values may be present in a read-only memory or according to other digital circuits of conventional nature for providing the functions described.

If the nominal and actual values do not agree, the microcomputer 41 provides an output (no-go) signal which indicates that the scan is not taking place in the prescribed program. This output signal can be used to switch the system off, over to a standby system, or to warn an operator and call for appropriate maintenance or recalibration.

To monitor the signals radiated from the elevation station, the transponders are arranged one on top of another and mounted on a mast. The height of the uppermost transponder is determined by the largest elevation pointing angle in conjunction with the distance to the transmitting facility of the elevation station. The apparatus and operation of the system in elevation is entirely analogous to the azimuth operation chosen for the foregoing detailed description.

What is claimed is:

1. In a scanning-beam microwave landing system of the time reference type, the combination comprising:

first means including a transmitter and a directive antenna for transmitting a continuous wave narrow beam of microwave energy and for scanning said beam through a predetermined angular sector in successive scan cycles each consisting of a sweep from a starting angular position through said sector to a predetermined angular limit and a return sweep from said angular limit through said sector to said starting angular position;

second means including a receiver and duplexing means, said receiver and said transmitter being connected to said antenna through said duplexing means to permit contemporaneous operation of said transmitter and said receiver through said antenna;

third means comprising a plurality of transponders each located at a discrete angle within said sector, said transponders including means responsive when said beam scans across each of said discrete angles, to modulate and retransmit to said antenna, a signal discretely modulated as a function of the corresponding discrete transponder angle, said receiver being responsive to each retransmitted signal during said sweep of said beam across said angle of each corresponding transponder; and fourth means responsive to the output of said receiver for providing an angle reference for each discrete transponder angle and for comparing the scanning angle at which each of said modulated transponder signals is received with said reference angle for each corresponding transponder, to provide an output signal indicative of any non-correspondence between any of said reference angles and the scanning angle at which the corresponding modulated retransmitted signal is received.

2. Apparatus according to claim 1 in which said transponders each include a transponder antenna, a circulator having a common port connected to said transponder antenna, a source providing a discrete identity signal representative of the angle of a corresponding one of said transponders, and a modulator responsive to said identity signal and a first port of said circulator to modulate received energy from said transponder antenna, the output of said modulator being connected to a second port of said circulator for retransmission.

3. Apparatus according to claim 1 in which said transponders are located on an arc centered on said antenna and within said sector and therefore are substantially equidistant from said antenna.

4. Apparatus according to claim 1, 2 or 3 in which said discrete angles of said transponders are evenly distributed within said sector.

5. Apparatus according to claim 1 in which said transponder source of said discrete identity signals comprises means for generating said identity signals as substantially sinusoidal waveforms.

6. Apparatus according to claim 1 or 5 in which said fourth means comprises fifth means for separating said retransmitted signals received by said receiver by frequency of modulation.

7. Apparatus according to claim 6 in which said fifth means includes a frequency counter for each of said separated retransmitted signals, and in which said reference angle is provided by an addressable memory.

* * * * *